Figure 1:
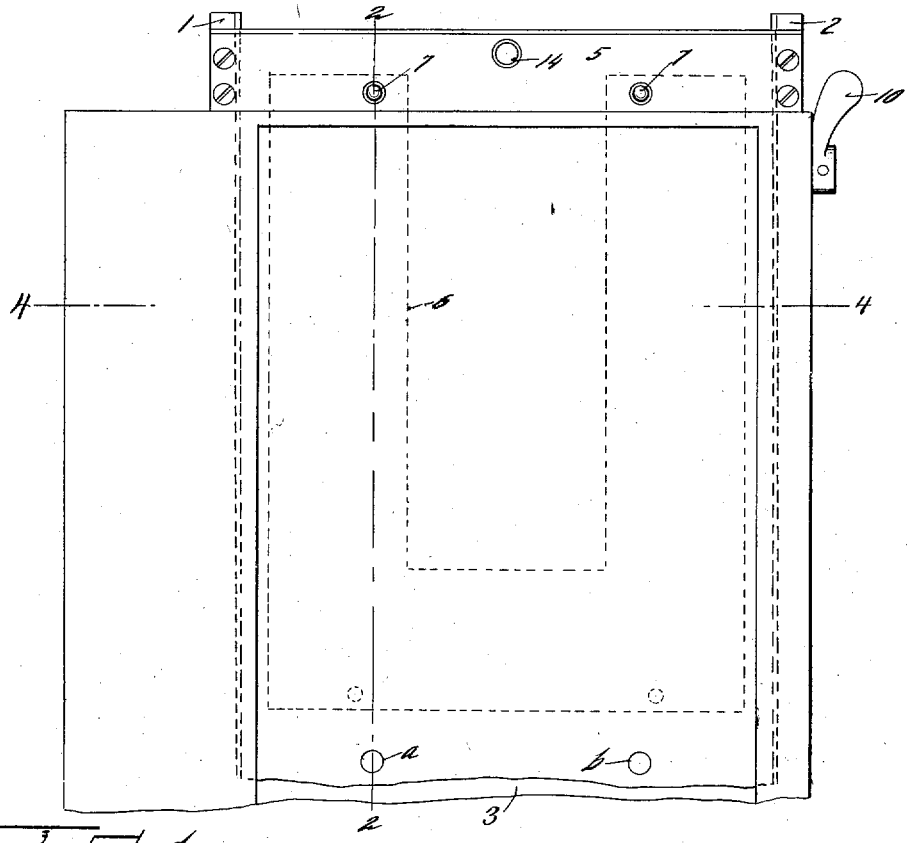

A. KRAUTH.

AUTOGRAPHIC REGISTER.

APPLICATION FILED MAY 1, 1916.

Reissued Aug. 29, 1916.

14,189.

2 SHEETS—SHEET 1.

Inventor

Albert Krauth

Witnesses

C. B. Foster

L. A. Beck

By Wood & Wood

Attorneys

A. KRAUTH.

AUTOGRAPHIC REGISTER.

APPLICATION FILED MAY 1, 1916.

Reissued Aug. 29, 1916.

14,189.

2 SHEETS—SHEET 2.

Inventor

Albert Krauth.

Witnesses

C. B. Foster.

L. A. Beck

By Woodworth

Attorneys

UNITED STATES PATENT OFFICE.

ALBERT KRAUTH, OF HAMILTON, OHIO.

AUTOGRAPHIC REGISTER.

14,189. Specification of Reissued Letters Patent. Reissued Aug. 29, 1916.

Original No. 1,122,508, dated December 29, 1914, Serial No. 815,393, filed January 30, 1914. Application for reissue filed May 1, 1916. Serial No. 94,834.

*To all whom it may concern:*

Be it known that I, ALBERT KRAUTH, a citizen of the United States, and residing at Hamilton, in the county of Butler and State of Ohio, have invented a new and useful Improvement in Autographic Registers, of which the following specification is a full disclosure.

My invention relates to manifolding machines or autographic registers, in which a plural number of webs of paper in superposed arrangement for manifolding, usually containing preprinted forms, as bills of lading, sales slips, and the like, are fed and exposed over a writing table and within a margin-frame area and withdrawn from the machine in their form lengths to be severed from the web across a tearing blade.

Machines of this class have been equipped with various forms of feeding and measured stroke delivery devices for extracting the webs in definite lengths corresponding to the length of form, which required careful manipulation and frequent adjustment of the several webs relatively within the machine to bring their printing data into registry and alinement accurately one over the other.

With my invention the difficulties heretofore encountered are avoided, and accurate measured length withdrawal insured, and the registry and alinement of the paper with respect to the various parts of the machine, and between the several strips for manifolding is perfectly maintained, irrespective of whether the paper is withdrawn by mechanical means or manually.

Each web of paper used in the machine has apertures alined longitudinally and in a spaced relation, the degrees of spacing representing the measured sheet or form lengths, and the apertures are utilized as indexes for strip coöperation with intercepting devices, said devices movable to engage through apertures when in registry therewith as the webs are drawn over the writing table determinately stopping the webs, appropriately with respect to various parts of the machine, so that the withdrawn portion can be severed from the strip across a tearing-blade at the proper point, withholding a subsequent length portion over the writing table against displacement and definitely exposing its writing surface area within the margin frame, alining and registering the several superposed strips and maintaining the alinement and registration.

An object of the invention is to provide means capable of intercepting a strip of paper in its withdrawal from the machine, by engaging therethrough at predetermined measured intervals, divisional of specific sized sheet blanks, to arrest its advance or withdrawal for subsequent performances, as in presenting the extracted paper full sheet length for severance and restraining a successive sheet length within the machine upon the writing table. This enables the operator to withdraw and sever constant invariable sheet lengths of paper without careful observation.

Another object of my invention is to provide a frame structure having a gate channel through which the paper is longitudinally withdrawn, the upper wall of the channel provided with a knife edge across which the paper is severed, and a yielding member provided with protuberances moving transversely through the channel, to automatically engage through perforations formed in the paper, and arrest its withdrawal until manually released.

The features of my invention will be more fully disclosed by the accompanying drawings depicting a preferred embodiment thereof, and the following description thereof, forming a part of the specification, and in the drawings like characters of reference denote corresponding parts throughout the various views.

Figure 3:
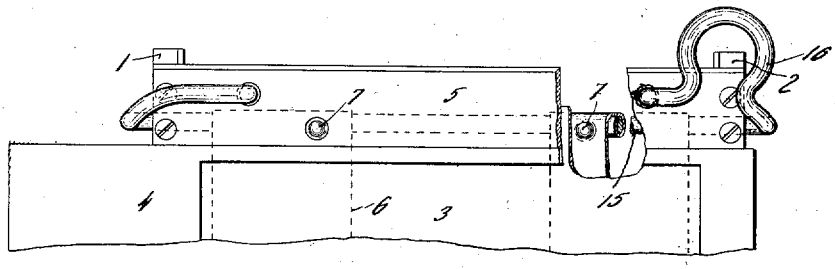
Figure 2:
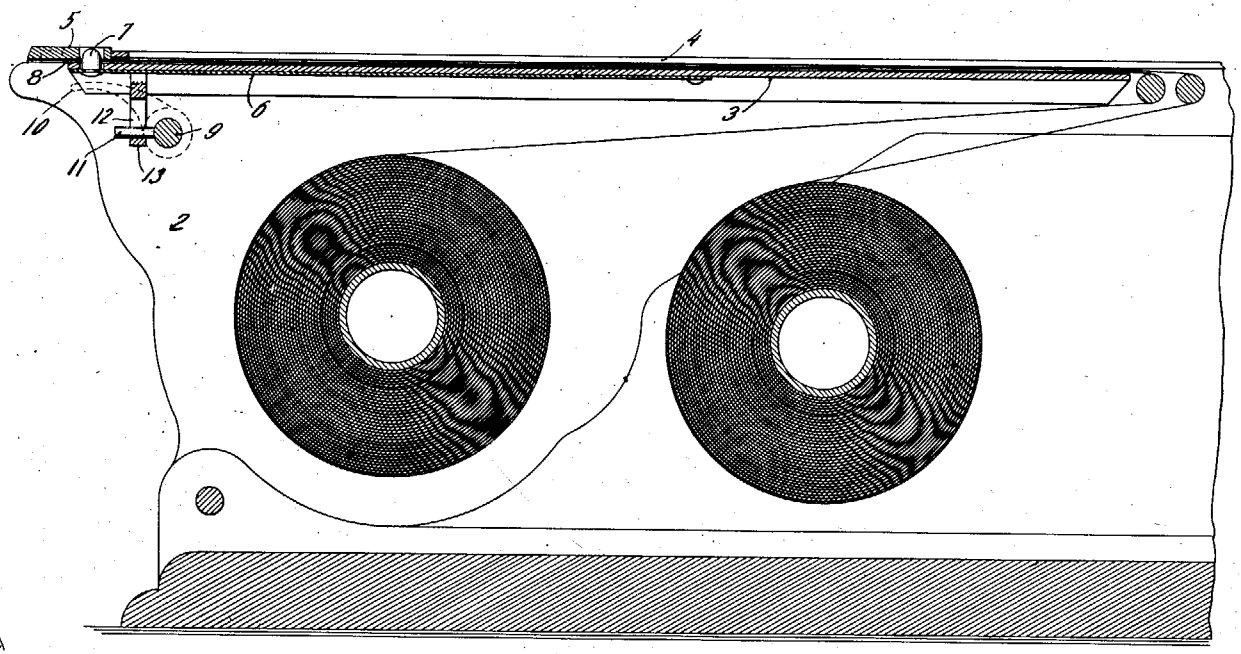
Figure 4:
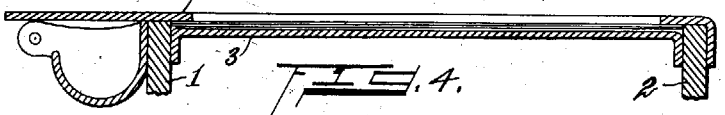

Figure 1 is a top plan view of an autographic register containing my improvement. Fig. 2 is a section on line 2—2 Fig. 1. Fig. 3 is a mutilated top plan view of a modified form. Fig. 4 is a section on line 4—4, Fig. 1.

The invention has particular utility in a manifolding device, wherein the spring pressed members for entering the web apertures are combined with the writing table and margin frame. The said members are alined with the web apertures and serve to maintain the necessary registry on the table of superposed webs producing accurate copy, as well as definitely determining the web length to be severed, and holding the web on the table for the tearing operation.

Also, the said members are positioned adjacent the writing space on the table defined by the margin frame, so as to provide ample writing surface area. Normally, that is, when the device is used for writing or during the tearing operation, or when not in use, as between operations, the pins pass through corresponding web apertures to prevent the web from being drawn over the table until the pins are retracted. In such normal position they aline the web strips on the table and assist in holding them taut for writing, and in precise registry.

It is only during the web withdrawal operation that the pins are retracted from web apertures, and when the retracting trip is released and the web withdrawn, the pins will yieldingly press against the non-perforated portions of the web in alinement with the apertures, and so automatically enter the next succeeding pair of web apertures brought into registry with the pins. These pins thus function with reference to the length of the strip to be severed, and also in relation to the web position and registry on the writing table, so that more perfect manifold work is performed, as well as the insurance of uniform length strips.

As disclosed in the drawings, the invention is embodied in the simplest form of autographic registers known as "pull-out" machine, wherein the paper is manually withdrawn a given length and pulled across a knife edge to sever it from the continuous web length supported within the machine.

As commonly used the manifold devices carry an original and two carbon copies, so that there are three web strips to be drawn over the table and accurate copy depends upon precise web registry on the table.

In withdrawing, only the top and bottom webs are grasped between the fingers or drawn off rolls when they are employed, the intermediate web being withdrawn by the friction of the top and bottom web on the middle web, so that there is a constant tendency for the intermediate web to lag, which increases as the webs unwind, until a part is reached wherein the middle sheet is no longer in registry with the top and bottom sheets. With my invention the pins entering the web apertures exert a drawing influence on the intermediate web counteracting this lag tendency, and as they operate for each length of strip severance, they correct up the registry at each operation, and prevent the lag increment which would otherwise gradually increase until the intermediate copy did not correspond with the top and bottom. The pins also correct and prevent lateral displacement when severing the sheets across a tearing-blade. This is of great practical importance in certain classes of work where the manifold device must uniformly produce identical copy, if it is to be used in place of manual clerical work.

In this type the invention contributes toward its greatest capacity in its coöperation with the apertures or indexing of the strip or strips of paper fed and positioned over the writing table.

It is obvious, however, that the invention is applicable to the various styles and types of registers without a departure from the features disclosed herein.

The machine contains the usual side frames 1 and 2, which may each be of sectional form, one section hingedly mounted upon the second for convenient access into the interior of the frame. The side frames are provided with supports for journaling the webs of paper under a proper degree of tension. A writing-table 3 is secured upon and supported between the side frames over which the paper from the webs is fed, and 4 represents a hingedly mounted margin frame mounted above the writing table and beneath which the paper is fed. The writing table is mounted between the side frames so that its upper surface over which the webs pass is slightly below the upper edges of the side frames, whereby the walls of the frames serve as guides for the webs, and the table width usually is approximately that of the webs. The forward end of the machine is provided with a tearing-blade 5 secured to the side frames and at an elevation slightly above the writing table to permit the paper to be fed beneath the tearing-blade, as it is withdrawn from the machine, whereby the paper can be pulled across the knife edge of the blade to sever the withdrawn lengths. The paper is perforated or apertured at predetermined intervals divisional of the specific sized sheet blanks of which the strip of paper is comprised, or designating limits in the paper withdrawal from the machine. The drawings disclose a sheet or strip provided with two alined perforations, *a*, *b*, within the divisional spacing separating the sheet blanks, but any number may be provided and their disposition modified depending upon the position of the paper arresting means from the paper exit. They are also shown as arranged in pairs transversely of the webs for in the plurality additional advantages are obtained. A flexible member 6 is fixed to the under surface of the writing table 3 and extended forward so that its free end is beneath the tearing blade. This member is provided with one or more pins or detents 7, which project through an orifice in the writing table and into an orifice in the tearing blade, moving transversely through the gate channel 8 formed intermediate of the side walls 1, 2, writing table 3 and tearing blade 5, through which the paper is longitudinally drawn. The flexible member 6 normally urges its pin or pins toward the tearing blade, and against the under surface of the paper during its withdrawal so as to automatically intercept the paper within the channel when a given perforation registers with the pin, or line of perforations when a series of pins are employed, to arrest further withdrawal of the paper and thereby define a predetermined sheet length, into which the strip is divided.

In the drawings I have shown two flexible members 6 each carrying a pin, and it is obvious that a single flexible plate may be employed carrying any number of pins corresponding to the number of divisional perforations. The plate is depressed to disengage the pins from the perforations and clear the channel. This is accomplished by the provision of a rock-shaft 9 journaled in the side frames 1 and 2, with a handle 10 fixed to one end of the shaft which is preferably projected beyond one of the side frames to provide the handle exterior of the frame. The rock-shaft is provided with a pin or arm 11 engaging through an elongated slot 12 formed in an arm 13 fixed to the flexible plate 6. Therefore, when the lever is depressed it will correspondingly depress the flexible plate moving its pin or pins below the surface of the writing table to release its paper interceptions.

In the drawings I have illustrated a rock shaft as connected with all of the flexible blades of the series to simultaneously depress all of the pins. It is obvious, however, that a single blade may be employed provided with an extension extending beyond the frame adapted to be engaged by the operator and the flexible plate punched to provide tangs the equivalent of the pins, as illustrated in the modified view shown in Fig. 3.

The tearing-blade 5 is provided with an aperture 14, for the insertion of the pencil so as to slightly depress the paper and offer convenience for manually grasping the paper when it is desired to withdraw the same from the machine. It will be noted that it is only necessary to depress the pins until the paper has been moved sufficiently to prevent registry of the pins with the perforations when they can be released so as to engage the under surface of the paper and snap into position through successive perforations for a subsequent operation. By this construction constant invariable measured lengths of paper can be withdrawn from the register and the successive sheets properly positioned upon the writing table for entry purposes and manifold purposes, in which the alinement and printing registry is positively maintained between the several superposed sheets. In severing the paper beyond the perforations the pins are normally engaged through the perforations and serve as a brake for restraining rearward movement of the paper beneath the margin frame.

In providing a plural number of pins or fingers, in a spaced relation laterally of the paper, both move as barriers across the path of the paper, and assume a definite and fixed location with respect to the writing table and different parts of the machine, as they enter and pass through the apertures they will shift the paper either longitudinally or laterally or in a direction to bring the apertures in absolute registry over the pins, should the sheets become slightly displaced as to their registry and alinement. Such drawing influence of the pins upon the paper therefore corrects the slightest inaccuracy in registry and alinement, and as such correction is inherent and automatic, and is made with each intercepting motion of the pins, no opportunity is left for the errors to compound, especially when operating upon a manifold number of webs.

The pins are adapted to engage against a surface, in the instance herein, the under surface of the paper, and being yieldingly mounted bear against the paper so as to automatically snap into position through the apertures when brought into registry therewith. The tension, however, need only be very slight, so as not to materially act as a retard against a free paper feed, or penetrate into the paper, yet sufficient to shift the sheets, when entering or passing through the apertures. The yielding influence of the pins or fingers insures their coöperation with the apertures or indexes as the paper is fed or drawn over the table irrespective of the rate at which the paper is fed and insures a stopping of paper advance at each line of apertures irrespective of their longitudinal spacing of the apertures. Therefore, the paper control depends upon the degrees of longitudinal aperture spacing and not upon any measured or definite length of printed form, and if the spacing is irregular the sheet lengths withdrawn are irregular, and with accurate relative longitudinal spacing of apertures located with relation to the printed form lengths a corresponding control of paper results.

In the construction shown, a stationary or fixed tearing blade 5 is provided. The blade also functions as a cross bar extending over the writing table and apertured to receive the pins 7 and thus provides a member with which the pins coöperate. This cross bar feature may be provided as an independent element instead of as a component or integral portion of the tearing blade and placed in relation to the pins and writing table to provide for passage of the paper between the writing table and cross member, for confining the paper in a feeding plane, and insure the pin engagement through the apertures. In the instance illustrated the cross member prevents the paper from being flexed by the pin engagement against the under surface of the paper in their upward yielding influences. While I have illustrated the pins each as engaging through an aperture in the cross member, it is obvious that an efficient result can be obtained by disposing an edge of the cross member adjacent the pins, nor do I wish to be limited to the cross bar as a stationary member.

In the modified view, Fig. 3, I have shown the ends of the flexible plates 6 as curled to receive the rod or wire 15 for depressing the plates. The ends of the wire are bent upwardly and horizontally over the tearing blade 5 and thence downwardly, each end respectively projecting through an orifice in the tearing blade for engaging the upper surface of the paper to depress the free end of the paper, for a convenient grasp thereof, simultaneous with the retreat of the pins or paper engaging protuberances 7. One end of the wire 15 is bent to form a thumb-hold 16. The pins, as shown in said view, are formed integral with their blade by stamping. I have shown the tearing blade 5 as an independent component of the machine, but it is obvious, and also herein contemplated, to form the same integral with the margin frame and a practice known in the art.

Having thus described my invention, I claim as new and desire to secure by Letters Patent of the United States:—

1. A device of the nature disclosed combining a frame from which a strip of paper is withdrawn, the strip having apertures predeterminately spaced longitudinally with its direction of withdrawal, and a member yieldingly urged toward a face of said paper, adapted to engage through a registering aperture in the paper to intercept its progress.

2. A device of the nature disclosed combining a frame structure provided with a gate channel through which a strip of paper is withdrawn, the strip having apertures alined longitudinally with its direction of withdrawal, and an abutment member yieldingly urged against a face of the strip and transversely movable through the channel walls to engage through a registering aperture in the paper to intercept the paper withdrawal.

3. A device of the nature disclosed combining a frame structure provided with a gate channel through which a strip of paper is withdrawn, the strip having apertures alined longitudinally with its direction of withdrawal, an abutment member yieldingly urged against a face of the strip and transversely movable through the channel walls to engage through a registering aperture in the paper to intercept the paper withdrawal, and means for manually moving said abutment for strip release.

4. A device of the nature disclosed combining a frame structure provided with a gate channel through which a strip of paper apertured at definitely spaced intervals is longitudinally manually withdrawn, the upper wall at the terminal of said channel having a knife edge for severing the withdrawn paper, and a yielding member having pins transversely movable through said channel and walls thereof to engage through registering apertures in the paper, within the channel to arrest its movement, said member capable of being manually depressed to release the paper.

5. In an autographic register, a pair of side frames for supporting therebetween webs of paper, a writing table secured to said side frames over which the paper from the webs is drawn, a plate having a knife edge secured upon said side frame above the writing table at one end thereof beneath which the paper is drawn, and a yielding member having an element normally urged against the paper beneath said plate to intercept the same through registering apertures therein provided at definitely spaced intervals to arrest the paper withdrawal, said member being manually depressed for releasing the paper.

6. In an autographic register, a pair of side frames for supporting therebetween webs of paper, a writing table connecting said frames, over which the paper from the webs is drawn, a plate connected to said side frame at an elevation above said table and at one end thereof, forming an intermediate passage for the paper, a series of yielding members each having a protuberance projected therefrom normally transverse across said way to intercept the paper through registering apertures formed therein at definitely spaced intervals to arrest the longitudinal movement of the paper, a manually operated rocker member, accessible from the exterior of register, engaged with said yielding member for passage clearance and release of the paper.

7. In an autographic register, a pair of side frames for supporting therebetween webs of paper, a writing table connecting said frames, over which the paper from the webs is drawn, a plate connected to said side frame at an elevation above said table and at one end thereof, forming an intermediate passage for the paper, a series of yielding members each having a protuberance projected therefrom normally transverse across said way to intercept the paper through registering apertures formed therein at definitely spaced intervals to arrest the longitudinal movement of the paper, a manually operated rocker member, accessible from the exterior of register, engaged with said yielding member for passage clearance and release of the paper, and means combined with said rocker member for moving the paper away from said plate for manually grasping the same.

8. A device of the nature disclosed combining a frame structure through which a strip of paper with serial apertures is withdrawn, and transversely movable means having paper engaging members functioning alternately, one to engage through a registering aperture to intercept the withdrawal of the paper and the second to flex the paper for accessible manual grasp.

9. In an autographic register, a pair of side frames, said frames having a supply strip of paper provided with serial apertures, a member secured between the side frames which the paper passes in its withdrawal, and a member having an element yieldingly urged against a face of the paper adapted to engage through a registering aperture in the paper and into said first-named member to intercept the paper withdrawal.

10. In an autographic register, a frame structure having a supply strip of paper with series apertures, a rigid member at the paper withdrawal end of the frame structure which the paper passes, an intercepting member yieldingly urged against a surface of the paper to engage through a registering aperture in the paper and into said rigid member to intercept the paper withdrawal, and manually operated means for said last-named member for releasing the paper.

11. In a manifolding device, a web supporting frame, a writing table over which the web is drawn, the web longitudinally having apertures in spaced relation, a margin frame over the table, a member positioned in alinement with the web apertures and yieldingly urged toward the web for successively entering apertures as the web is withdrawn, said member being engaged through a web aperture normally preventing the web from being drawn over the table, said table and member being relatively positioned adjacent the writing space defined by the margin frame to aline the web in writing position on the table, and a trip for manually retracting said member, enabling web withdrawal, the manual release of said trip positioning said member for automatic engagement through the next registry web aperture.

12. In a manifolding device a web supporting frame, a writing table over which the web is drawn, the web longitudinally having apertures in spaced relation and alined crosswise of the web, a margin frame over the table, a cross member over the table beneath which the web passes, a coacting spring-pressed member in alinement with the web apertures, and yieldingly urged toward said member, said member and spring-pressed members being relatively positioned adjacent the writing space defined by the margin frame to aline the web in writing position on the table and to maintain relative registry of several superposed webs drawn over the table, the said spring-pressed member engaging through a registering web aperture, normally preventing web withdrawal and holding the web in position for writing, and means for retracting said spring-pressed member, enabling the web to be drawn over the table and to pass between said abutment and spring-pressed members, said spring-pressed member yieldingly engaging non-perforated portions of the web when the web is withdrawn in position to enter the next registering aperture.

13. A device of the nature disclosed combining a frame, a writing table mounted within said frame for supporting a plurality of webs in superposed arrangement and over which the webs are drawn, the webs each having apertures spaced longitudinally and crosswise of the web, detents in spaced relation laterally of said table, adapted to engage through registering apertures, and a cross member supported in a superposed relation to the table, and beneath which the webs pass to confine the webs upon the table at the detents.

14. A device of the nature disclosed combining a frame, a writing table mounted within said frame for supporting a plurality of webs in superposed arrangement and over which the webs are drawn, the webs each having apertures spaced longitudinally and crosswise of the web, detents in spaced relation laterally of said table, adapted to engage through registering apertures, means operating automatically upon the withdrawal of the paper to engage the detents through the apertures, means for disengaging the detents, and a cross member supported in a superposed relation to the table, cooperating with said detents and beneath which the webs pass to confine the webs upon the table.

15. A device of the nature disclosed combining a frame, a writing-table mounted within said frame for supporting a plurality of webs in a superposed arrangement and over which they are drawn, the webs, each having apertures spaced longitudinally of the web and in a series crosswise of the web, detents supported in a spaced relation crosswise of the table movable transverse to the table and webs upon the table to engage through registering apertures in the webs, and means for retracting said detents from the web engagement.

16. A device of the nature disclosed combining a frame, a writing-table mounted within said frame and therewith providing a guide channel for supporting a plurality of webs in superposed arrangement, the webs each having apertures in spaced relation longitudinally and crosswise, and detents in a spaced relation corresponding to the crosswise web aperture spacing mounted to move transversely to the table to engage through registering apertures in the webs upon the table.

17. A device of the nature disclosed combining a frame, a writing table mounted within said frame and therewith providing a guide channel for supporting a plurality of webs in superposed arrangement to be drawn over the table, the webs each having apertures in spaced relation longitudinally and crosswise, and detents yieldingly mounted to move transversely to the table to engage through registering apertures and to be retracted therefrom, and a member extending crosswise of the table bridging over the webs at the detents to confine the webs upon the table.

In witness whereof, I hereunto subscribe my name, as attested by the two subscribing witnesses.

ALBERT KRAUTH.

Witnesses:
F. G. Diesbach,
M. Wm. Krauth.